(12) United States Patent
Walker et al.

(10) Patent No.: US 9,370,817 B2
(45) Date of Patent: Jun. 21, 2016

(54) METHOD AND SYSTEM FOR PROGRAMMING THE CONTROL OF A MULTIAXIS FORMING MACHINE AND FORMING MACHINE

(75) Inventors: Thomas Walker, Reutlingen (DE); Wolfgang Schad, Altdorf (DE); Uwe-Peter Weigmann, Nürtingen (DE)

(73) Assignee: WAFIOS AG (DE)

( * ) Notice: Subject to any disclaimer, the term of this patent is extended or adjusted under 35 U.S.C. 154(b) by 392 days.

(21) Appl. No.: 14/110,961

(22) PCT Filed: Mar. 28, 2012

(86) PCT No.: PCT/EP2012/055518
§ 371 (c)(1),
(2), (4) Date: Nov. 4, 2013

(87) PCT Pub. No.: WO2012/139894
PCT Pub. Date: Oct. 18, 2012

(65) Prior Publication Data
US 2014/0046476 A1 Feb. 13, 2014

(30) Foreign Application Priority Data

Apr. 12, 2011 (DE) .......................... 10 2011 007 183

(51) Int. Cl.
*G05B 19/18* (2006.01)
*B21F 3/04* (2006.01)
(Continued)

(52) U.S. Cl.
CPC ... *B21F 3/04* (2013.01); *B21F 3/02* (2013.01); *G05B 19/182* (2013.01); *G05B 19/186* (2013.01); *G05B 19/4093* (2013.01); *Y02P 90/265* (2015.11)

(58) Field of Classification Search
CPC ........... B21F 3/04; B21F 3/02; G05B 19/182; G05B 19/186; G05B 19/4093; Y02P 90/265
See application file for complete search history.

(56) References Cited

U.S. PATENT DOCUMENTS

| 4,205,543 A | 6/1980 | Wright |
| 4,510,565 A * | 4/1985 | Dummermuth .... G05B 19/4147 700/169 |

(Continued)

FOREIGN PATENT DOCUMENTS

| CN | 1467045 | 1/2004 |
| CN | 200995257 Y | 12/2007 |

(Continued)

OTHER PUBLICATIONS

Hans B. Kief et al., "NC/CNC Handbuch 2007/2008", Hanser, pp. 340 and 341.

(Continued)

*Primary Examiner* — Ramesh Patel
(74) *Attorney, Agent, or Firm* — DLA Piper LLP (US)

(57) ABSTRACT

A method of programming control of a forming machine which has a plurality of controllable machine axes includes displaying an axis selection menu with graphical symbols for machine axes of the forming machine; receiving an input for selection of a machine axis to be programmed; displaying an axial movement menu containing options for the input of movement parameters for definition of a course of movement of the axial movement of the selected machine axis; receiving inputs for definition of movement parameters; displaying an axial movement coordination menu containing options for input of coordination parameters for definition of a coordination of courses of movement of the axial movements of machine axes; receiving inputs for definition of values for coordination parameters.

21 Claims, 8 Drawing Sheets

(51) Int. Cl.
*B21F 3/02* (2006.01)
*G05B 19/4093* (2006.01)

(56) References Cited

U.S. PATENT DOCUMENTS

| | | | | |
|---|---|---|---|---|
| 4,669,289 A * | 6/1987 | Itaya | ......................... | B21F 3/00 72/138 |
| 5,816,091 A | 10/1998 | Sautter et al. | | |
| 5,839,312 A | 11/1998 | Itaya | | |
| 5,865,051 A * | 2/1999 | Otzen | ..................... | B21C 47/18 226/137 |
| 5,875,664 A * | 3/1999 | Scott | ......................... | B21F 3/12 72/135 |
| 5,875,666 A | 3/1999 | Itaya | | |
| 6,006,572 A * | 12/1999 | Tsuritani | ............... | B21F 23/002 72/135 |
| 6,062,054 A * | 5/2000 | Abiru | ........................ | B21F 3/02 72/132 |
| 6,318,416 B1 * | 11/2001 | Grueninger | .......... | A47C 27/062 140/3 CA |
| 6,648,996 B2 * | 11/2003 | Hasegawa | ................. | B21F 3/02 148/580 |
| 6,836,964 B2 * | 1/2005 | Hasegawa | ................. | B21F 3/02 29/896.9 |
| 6,928,846 B2 | 8/2005 | Furuse | | |
| 7,134,305 B2 | 11/2006 | Wu | | |
| 2002/0022905 A1 * | 2/2002 | Erlanoen | .............. | G05B 19/416 700/181 |
| 2002/0108419 A1 | 8/2002 | Itaya | | |
| 2002/0191002 A1 | 12/2002 | Friedrich et al. | | |
| 2003/0069720 A1 * | 4/2003 | Zhang | ................... | F15B 19/007 703/7 |
| 2004/0193303 A1 * | 9/2004 | Fore, Sr. | .............. | B65H 67/052 700/126 |
| 2004/0225955 A1 | 11/2004 | Ly | | |
| 2006/0053853 A1 | 3/2006 | Wu | | |
| 2008/0270927 A1 | 10/2008 | Chang | | |
| 2010/0305758 A1 * | 12/2010 | Nishi | ..................... | B23Q 17/00 700/264 |
| 2012/0187889 A1 | 7/2012 | Krauskopf et al. | | |

FOREIGN PATENT DOCUMENTS

| | | |
|---|---|---|
| CN | 101559463 | 10/2009 |
| DE | 101 34 826 | 9/2002 |
| DE | 10 2009 023 475 | 12/2010 |
| DE | 10 2009 024 262 | 12/2010 |
| EP | 0 804 978 | 11/1997 |
| EP | 1 148 398 | 10/2001 |
| EP | 1 637 251 | 3/2006 |
| GB | 2 023 040 | 12/1979 |

OTHER PUBLICATIONS

Office Action dated Feb. 16, 2012 from corresponding German Patent Application No. 10 2011 007 183.0.
International Search Report dated May 22, 2012 from corresponding International Patent Application No. PCT/EP2012/055518.
Chinese Office Action dated Jan. 13, 2015 of corresponding Chinese Application No. 201280028719.5 with English translation.
US Office Action dated May 15, 2015 for related U.S. Appl. No. 14/111,230.
Written Opinion dated Apr. 3, 2012 from PCT/EP2012/056065 with English translation.
Chinese First Office Action dated Aug. 11, 2015 of corresponding Chinese Application No. 201280028716.1 along with its English translation.

* cited by examiner

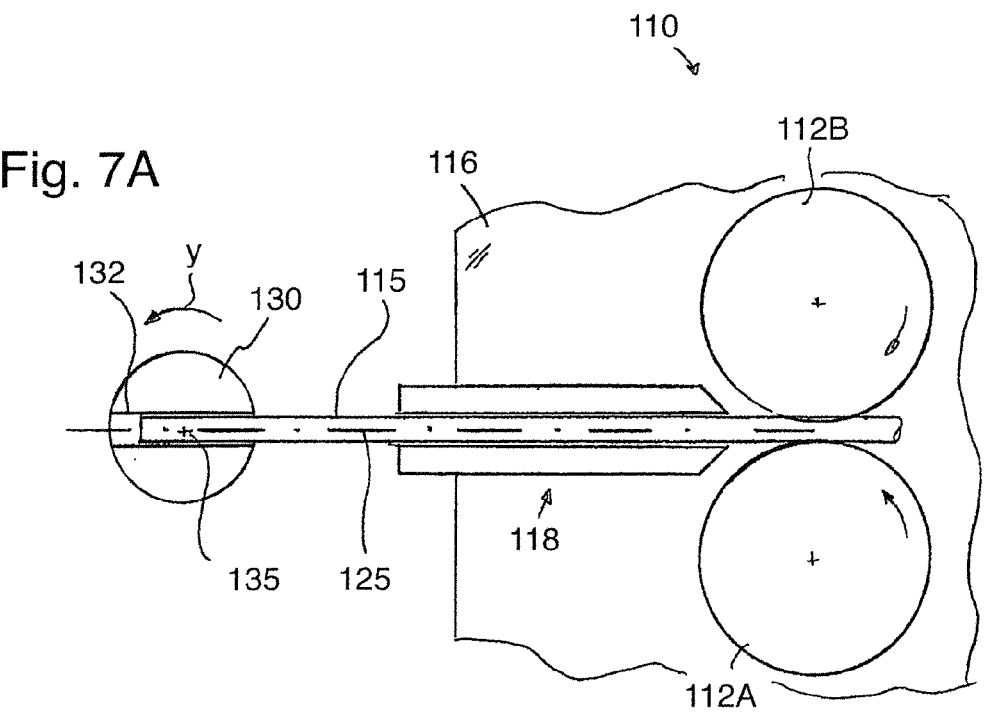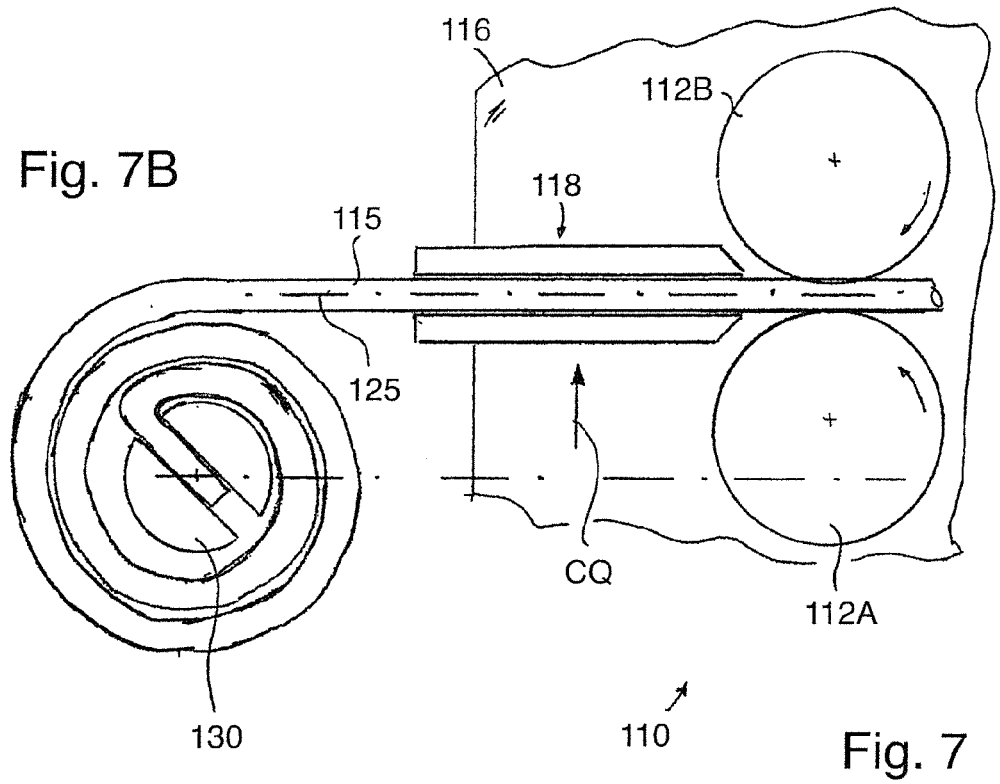

METHOD AND SYSTEM FOR PROGRAMMING THE CONTROL OF A MULTIAXIS FORMING MACHINE AND FORMING MACHINE

TECHNICAL FIELD

This disclosure relates to a method of programming the control of a forming machine, a system of programming the control of a forming machine and a forming machine.

BACKGROUND

Forming machines are machine tools which, with the aid of suitable tools, can produce larger or smaller series of molded parts, sometimes of complex geometry, from semi-finished products such as wire, pipe, strip or the like, predominantly by forming in an automatic fabrication process. For example, a forming machine may be a bending machine that produces bent parts from wire material, strip material or pipe material or a spring machine that manufactures compression springs, tension spring members, torsion springs or other spring-like molded parts. A forming machine may also be designed, for example, as a machine to make wire nails for the mass production of screws, nails, rivets or the like.

A multiaxis forming machine controlled by computer numerical control has a plurality of controllable machine axes, a drive system with a plurality of electric drives that drive the machine axes, and a control device for the coordinated control of movements of the machine axes during a fabrication process according to a computer-readable control program specific for the fabrication process.

The movements provided for manufacture of the molded part and the sequence thereof are stored in this control program in the form of NC sets, which can be programmed differently (for example, machine-oriented or machine-independent). The control program is executed during the fabrication process for each molded part of a series, converted into control signals for the drives, and thus produces coordinated axial movements of the machine axes.

With some forming machines there is the possibility to undertake workpiece-based programming. With workpiece-based programming geometrical data can be input via an operator unit, the data describing the desired geometry (target geometry) of the molded part to be produced. When fabricating bent parts made from wire (for example, compression springs, torsion springs, spiral springs and other wire bent parts), the wire diameter and wire cross-section, the diameter of a finished spring, the number of windings of a spring, the pitch of a spring, angle of bend and/or lengths of a bent part and the like can be input, for example. The geometrical data is converted into a sequence of NC sets of the NC control program by an NC generator. It is therefore no longer necessary for an operator to access the level of the individual sentences to create the control program. If smaller changes are to be made to the program course and cannot be controlled by these input parameters or corresponding correction values, the NC program must be manipulated at NC set level, for example, to change an NC set or add a new NC set. The machine operator must have programming knowledge to do this.

EP 1 148 398 B1 describes an input method to program axial movements and events in industrial control systems which, in addition to manual input aids, also have a screen for visualizing the input process and displaying resultant actions. During this procedure, (a) editable blank diagrams for path/time curves for each axis and/or path/path relationships for pairs of master and slave axes are displayed to the user, and then (b) the path and time limits and/or path and time units are defined as needed, then (c) the path/time curves and/or the path/path relationships are entered into the diagrams by the input aids, and then the control program and/or the control code for the production process is generated by the control according to steps (a) to (c), wherein edited changes automatically take effect on the control program and on the control code. This input method is intended to assist the approach and mindset of a mechanical engineer and therefore to facilitate considerably the input for a mechanical engineer.

It could thus be helpful to provide a method of programming the control of a multiaxis forming machine, the method being particularly adapted to the needs and viewpoint of the machine operator and allowing intuitively understandable and flexible programming. In addition, a system suitable to carry out the method is also needed.

SUMMARY

We provide a method of programming a control of a bending machine that bends wire or pipe, the forming machine having a plurality of controllable machine axes, a control device for coordinated control of axial movements of the machine axes, and an operator unit with an associated display unit that operates the forming machine, including displaying an axis selection menu (AAM) with graphical symbols for machine axes of the forming machine, receiving an input for selection of a machine axis to be programmed, displaying an axial movement menu (ABM) containing options for the input of movement parameters for definition of a course of movement of the axial movement of the selected machine axis, receiving inputs for definition of movement parameters, displaying an axial movement coordination menu (ABKM) containing options for the input of coordination parameters for definition of a coordination of courses of movement of the axial movements of machine axes, and receiving inputs for definition of values for coordination parameters.

We also provide a system that programs control of a forming machine, which is a bending machine that bends wire or pipe, the forming machine having a plurality of controllable machine axes, a control device for coordinated control of axial movements of the machine axes, and an operator unit connected to the control device for data exchange and having an associated display unit to operate the forming machine, wherein the system carries out the method of programming a control of a bending machine that bends wire or pipe, the forming machine having a plurality of controllable machine axes, a control device for coordinated control of axial movements of the machine axes, and an operator unit with an associated display unit that operates the forming machine, including displaying an axis selection menu (AAM) with graphical symbols for machine axes of the forming machine, receiving an input for selection of a machine axis to be programmed, displaying an axial movement menu (ABM) containing options for the input of movement parameters for definition of a course of movement of the axial movement of the selected machine axis, receiving inputs for definition of movement parameters, displaying an axial movement coordination menu (ABKM) containing options for the input of coordination parameters for definition of a coordination of courses of movement of the axial movements of machine axes, and receiving inputs for definition of values for coordination parameters.

We further provide a bending machine that bends wire or pipe, having a plurality of controllable machine axes, a control device for the coordinated control of axial movements of the machine axes and an operator unit with an associated display unit that operates the forming machine, wherein the bending machine includes the system that programs control of a forming machine, which is a bending machine that bends wire or pipe, the forming machine having a plurality of controllable machine axes, a control device for coordinated control of axial movements of the machine axes, and an operator unit connected to the control device for data exchange and having an associated display unit to operate the forming machine, wherein the system carries out the method of programming a control of a bending machine that bends wire or pipe, the forming machine having a plurality of controllable machine axes, a control device for coordinated control of axial movements of the machine axes, and an operator unit with an associated display unit that operates the forming machine, including displaying an axis selection menu (AAM) with graphical symbols for machine axes of the forming machine, receiving an input for selection of a machine axis to be programmed, displaying an axial movement menu (ABM) containing options for the input of movement parameters for definition of a course of movement of the axial movement of the selected machine axis, receiving inputs for definition of movement parameters, displaying an axial movement coordination menu (ABKM) containing options for the input of coordination parameters for definition of a coordination of courses of movement of the axial movements of machine axes, and receiving inputs for definition of values for coordination parameters.

We still further provide a computer program product which is stored on a computer-readable medium or is implemented as a signal, wherein the computer program product, when loaded into the memory of a computer and run by a computer, causes the computer or a forming machine controlled by the computer to carry out the method of programming a control of a bending machine that bends wire or pipe, the forming machine having a plurality of controllable machine axes, a control device for coordinated control of axial movements of the machine axes, and an operator unit with an associated display unit that operates the forming machine, including displaying an axis selection menu (AAM) with graphical symbols for machine axes of the forming machine, receiving an input for selection of a machine axis to be programmed, displaying an axial movement menu (ABM) containing options for the input of movement parameters for definition of a course of movement of the axial movement of the selected machine axis, receiving inputs for definition of movement parameters, displaying an axial movement coordination menu (ABKM) containing options for the input of coordination parameters for definition of a coordination of courses of movement of the axial movements of machine axes, and receiving inputs for definition of values for coordination parameters.

BRIEF DESCRIPTION OF THE DRAWINGS

FIG. 7 shows a schematic view of the operating principle of a spiral spring machine having a draw-in device which can be adjusted during spring manufacture.

DETAILED DESCRIPTION

Figure 1A:
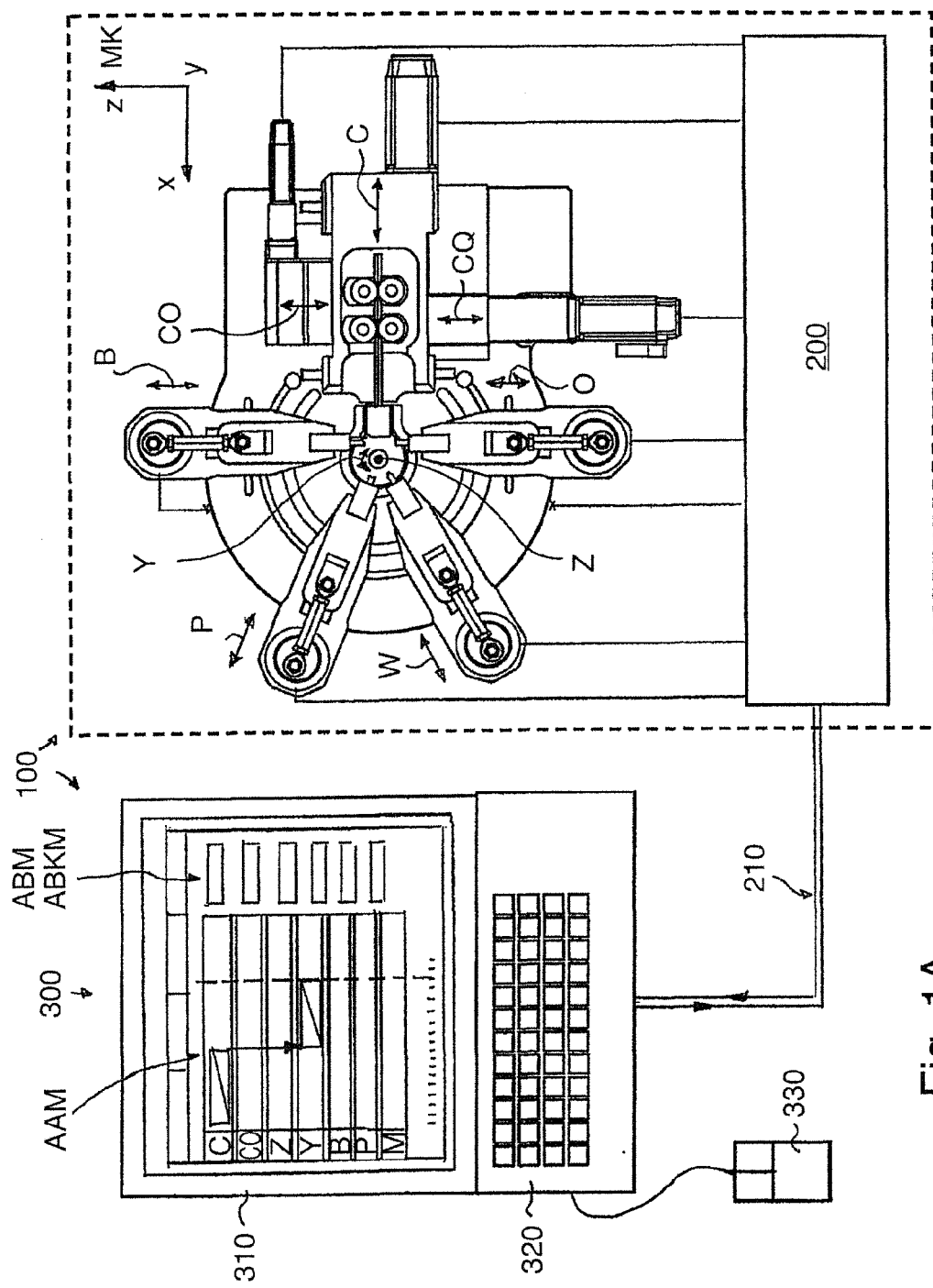
FIG. 1 shows an overall schematic view in FIG. 1A of a forming machine that manufactures spiral springs having some components of a system for programming the control of the forming machine, and in FIG. 1B shows a detail merely with electrical and mechanical components.

By the method and system, courses of movement can be created by an operator having no specific knowledge in the field of CNC machine programming.

In contrast to programming systems in which the geometry of the molded part to be produced is input, the method and system do without a mathematical model of the machine and tools thereof.

The course of movement of an axial movement defined by the movement parameters denotes the movement of an individual machine axis without reference to movements of other axes. The course of movement is characterized by position-based movement parameters, in particular by the start position of the axial movement (axial position at the start of the axial movement), the end position of the axial movement (axial position at the end of the axial movement), and one or more movement parameters for the change in position to be passed through between the start position and the end position.

With the aid of the movement parameters, courses of movement of the axial movements are programmed without having to use the input to input the duration of the axial movement necessary for the course of movement. The duration of an axial movement therefore does not have to be known during programming and emerges as a derived variable from the input movement parameters. Movement parameters are thus position-based parameters and not directly time-based parameters. In this regard, there is an important difference, for example, between methods and systems which operate by the principle of "electronic cam discs." Electronic cam discs are used if the position of one or more machine axes depends on the position of a master axis or of a master shaft, which defines the cycle time of the entire course of movement. A time "corset" is thus predefined for the axial movements. Direct time constraints of this type are therefore inapplicable when using our methods and systems.

Position-based movement parameters are preferably exclusively used or displayed and requested or input, wherein the duration of an axial movement emerges as a derived variable from the entered movement parameters.

Optimization over time of individual axial movements and/or coordination of two or more axial movements with one another can be managed very flexibly on the basis of the input axial movements. The programming of successive axial movements can be carried out just as easily as the programming of overlapping movements.

The term "menu" means a form of the interactive user interface which allows the operator to select and implement a command or an input from a predefined selection of possibilities. The term "axis selection menu" accordingly denotes a selection list containing all available programmable machine axes.

The term "machine axis" denotes generally a movable device which can be moved in at least one mechanical degree of freedom by at least one drive, for example, an electromechanical, electrohydraulic or electropneumatic drive. It may be a translatory machine axis which moves a linearly movable sliding carriage, for example, or a rotary machine axis, for example, a spindle. A machine axis can move either a tool or the workpiece.

The start position and the end position of an axial movement can be defined by a corresponding start value or end value respectively and a respective angular unit or length unit. To define a change in position, a speed value and an acceleration value are preferably received or input or generated. In this instance, the term "speed" means the first derivative of position as a function of time, whereas the term "acceleration" means the second derivative of position as a function of time or means the derivative of speed as a function of time.

In some cases, the speed value and/or the acceleration value is/are not requested or input in absolute values, but in relative values, in particular as a percentage of a corresponding maximum speed value or maximum acceleration value. Programming is thus highly simplified since the operator does not have to know the absolute limits for speed and/or acceleration of the machine axis to be programmed.

Preferably, it is also possible within the scope of the definition of a course of movement, to define a movement law for the change in position. To this end, a movement law menu containing a plurality of options for the input of a movement law type is preferably displayed. In particular, the movement law menu may contain a plurality of or all movement law types described in VDI guideline VDI 2143, volume 1. For example, a movement law type may be selected from the group having a quadratic parabola, a polynomial of order five, and a polynomial of order eight. Alternatively or in addition, the movement law menu may also contain other types of movement laws, for example, other polynomials (for example, of order eight) and/or an acceleration according to a modified acceleration trapezium. By the definition of a suitable movement law, it is possible, inter alia, to improve the course of movement in terms of an absence of jolting or as little jolting as possible. Depending on which movement law is selected, the axial movement requires more or less time between the start position and the end position, wherein the duration of the axial movement is typically longer in the case of movements with little jolting.

In some operating modes, the system or method merely allows the input or amendment of the start value and of the end value of the axial movement, wherein suitable speed values, acceleration values and a suitable movement law are automatically ascertained without any manipulation by the operator. In other operating modes there is more freedom with regard to the shaping of the course of movement, since not only are the start value and the end value requested from the operator for input, but also a speed value, an acceleration value and/or a suitable movement law.

With some machine axes, it is necessary for the end value thereof at the end of a movement cycle to be the same as the start value in a subsequent movement cycle. Such machine axes are referred to in this case as "reversing axes" and differ in this regard from "endless" or "non-reversing axes." In some cases, the programming is simplified since, when a new movement is input, the end value is first automatically set to the start value. The input is thus simplified for reversing axes. With non-reversing axes the end value, starting from this standard value, can then be changed accordingly to the desired final end value.

A display/input field is preferably displayed for the display and/or input of a movement parameter, and the movement parameter is received or displayed in the form of a numerical input value or in the form of a selection of an input from a list of input options. The display/input field is preferably displayed together with an automatically created unit for the input value. With a rotary machine axis an angular unit such as degrees, is normally displayed. With translator machine axes a length unit such as millimeters, inches or the like depending on the selected language or selected country, is typically displayed. With some types of machine axes, for example, those with slider crank mechanisms, a selection can be made from different units (angular unit or length unit).

It is possible, with the aid of the axial motion coordination menu, to coordinate with one another the courses of the movements of machine axes in an intuitively understandable manner. In particular, the coordination may be a purely temporal coordination or a coordination given by one or more conditions. One or more of the following input possibilities are preferably provided.

To achieve directly the definition of the temporal position of the start position by linking to the movement of another machine axis, a movement start menu containing at least one option to determine a condition for the start of an axial movement is preferably displayed or offered. If a movement has already been input for at least one other machine axis, all axial movements already input are preferably offered for selection of a linking to an axial movement which has already been programmed (input). In this case, an input field is preferably also displayed or offered which makes it possible to define the position of the linked axial movement at which the currently programmed axial movement is to start. This position may lie between the start value and the end value of the linked movement or at the start value or at the end value.

The condition for the start of an axial movement may be related directly to the time axis and defined accordingly, without direct reference to the movement of another machine axis. For example, it is possible in some examples to select an option in accordance with which a movement started directly at the temporal beginning of the total sequence.

To increase the flexibility for programming and any corrections which may be necessary later, the display of a time correction field is provided in some examples to allow the operator to input a time correction value which makes it possible to start the start position of the currently programmed axial movement earlier or later. The time correction value thus displaces the start position based on the time axis so that, by inputting a finite time correction value, a temporal displacement of the start position of the currently programmed axial movement can be generated. In one example, a negative input value means an earlier start, while a positive input value starts the movement accordingly later. Generally, a zero value (no temporal displacement) is pre-set as a standard value.

In some examples, one or more digital machine functions (M functions) can be included in the course such as an axial movement. To this end, a corresponding "machine function axis" can be displayed in the axis selection menu in addition to the programmable machine axes, it being possible to include in the machine function axis the activation of a machine function at suitable points, similarly to the input of an axial movement of infinitely short duration. When selecting the "machine function axis," a machine function start menu containing at least one option to determine (define) a condition for the start of a machine function is preferably displayed or offered. The desired machine function can be selected from the available machine functions, for example, switching of an electrical output, activation or monitoring of a function or the like, and thus input, for example, via an identification such as a number or an abbreviation. A plurality, for example, up to three, machine functions may optionally be started at the same time (under the same conditions).

A further flexibilization of the input and any subsequent corrections are possible in some examples since a movement sequence menu containing at least one option for the input of a reference to another axial movement is displayed or offered.

For example, one option may lie in the fact that axial movements can be programmed sequentially. In this case, the movement of one machine axis starts, after which the movement of a preceding machine axis is performed completely or in part. This option is called "stringing" of movements in one example.

According to another option, movements can be programmed in an interpolated manner. If this option is selected, the movements of a plurality of axes are performed parallel to one another at a specific ratio to one another. The movement phases of interpolated movements are of equal length. Interpolated movements are thus coupled on the time axis. Paths and accelerations emerge from the movement parameters predefined for the respective axis. In some cases, it is also possible to choose from a plurality of interpolation types, for example, linear interpolation or non-linear interpolation.

As a further option, a machine axis may be moved at constant speed during the entire production cycle. This option is called a "continuous" axis in one example.

As an alternative or additional option, a plurality of successive movements of one axis may be carried over into one another without a change in speed and/or without a change in acceleration. This function may also be called "overlooping."

A movement sequence menu may contain one or more of these options and/or other options which make it possible to define a reference to another axial movement.

In some examples, a rather clear and intuitively understandable possibility for the input emerges from the fact that a corresponding axial movement menu and a corresponding axial movement coordination menu are automatically displayed in response to an input that selects a machine axis to be programmed, wherein the axis selection menu is preferably displayed together with the axial movement menu and the axial movement coordination menu of the selected machine axis. A complete program dialogue is thus offered for the machine axis to be programmed, wherein this machine axis can also be presented in the context of other machine axes which are still to be programmed or have already been programmed. The selected machine axis may be highlighted in the selection menu by a marking, for example, by a change in color or the like, so that the machine operator can see at a glance at any moment which axis is currently programmed and, as the case may be, how the axial movement to be programmed is to be integrated in the context of other axial movements.

To further improve clarity, in some examples the movement of the machine axis defined by the movement parameters is displayed graphically in the axis selection menu in response to an input for definition of movement parameters. It has proven to be favorable if the movement defined by the movement parameters is displayed in the form of a field containing a normalized path/time diagram which is displayed in a time-correct manner based on a time axis common to all machine axes.

It is particularly preferable if axial movements and any possible links between axial movements are displayed in a common illustration based on a common time axis. At a glance, the machine operator can thus gain an impression of the course of movement already programmed.

In this case, the expression "time axis" denotes an axis of the illustrated graph on which a time-proportional measure is displayed. It may be absolute time (for example, in milliseconds). However, a relative time measure is preferably selected and displayed. In preferred examples the time axis is based on the maximum available operating speed of the machine to be programmed. With this scaling, a time interval on the time axis indicates how long a movement would last if the machine were operated at its maximum operating speed (100% speed). If the machine is operated more slowly during the production cycle, a longer absolute duration of course of movement emerges accordingly, wherein the ratio of the durations of the courses of movement appears correctly in the illustration in each case, however. The use of a relative time axis also has the advantage that the space available in the direction of the time axis can be utilized optimally in the display unit.

The "operating speed" of the forming machine is the speed at which the steps of the control program are converted as a whole into a sequence of movements of the machine axes. A pre-set operating speed has the same effect for all programmed fabrication steps of a fabrication process within the context of a scaling of the programmed speed. It is generally attempted to run the fabrication process at the fastest operating speed possible, since the production rate achievable during fabrication depends directly on operating speed.

Some examples offer the ability to display in a display field a current position value (or a position value present at a moment selected by an operator) of an axial movement based on a common time axis, this position value being characterized as a "current value," for example. The current moment may be illustrated, for example, by a line extending at right angles to the time axis and crossing the fields for the input of the individual axial movements. An operator can displace this pointer or cursor on the time axis during the input procedure to determine the current position of an axial movement at the moment defined by the pointer position.

In some examples it is possible to divide the graph illustrated on the display into a head portion, a middle portion, and a foot portion (along the time axis). The head portion is implemented once at the program start to perform initializations. The information provided in the middle portion is implemented n times, wherein n represents the number of necessary cycles. Details contained in the foot portion are implemented once the number of necessary cycles has been reached to again produce a basic state. The entire course input can thus be seen more clearly, at a glance, on the display.

We provide a system that programs the control of a forming machine. The system is also called a "programming system" in this case and comprises hardware portions and software portions which cooperate during the programming process. The forming machine has a plurality of controllable machine axes, a control device for the coordinated control of movements of the machine axes, and an operator unit connected to the control device for data exchange to operate the forming machine. A display unit is assigned to the operator unit and is part of the human-machine interface for visualization of inputs and displays and is controlled by the system. The system is configured to carry out the method.

In some modern forming machines, in particular in those having controlled machine axes and servodrives, our methods can be implemented with the drives and controls already provided. The ability to execute examples can be implemented in the form of additional program parts or program modules in the operating software or control software of computer-supported control devices.

We also provide a computer program product stored in particular on a computer-readable medium or is implemented as a signal, wherein the computer program product, when loaded into the memory of a suitable computer and run by a computer, causes the computer of a forming machine controlled by the computer to carry out our method or a preferred example thereof. The software portion of the programming system can thus be installed on machines which are already provided or which have been newly manufactured.

These and further features are clear from the appended claims, from the description and from the drawings, wherein the individual features are implemented alone or together in the form of sub-combinations in an example and in other fields, and may constitute examples which are advantageous and which can be protected separately. Examples are illustrated in the figures and will be explained in greater detail hereinafter.

Figure 1B:
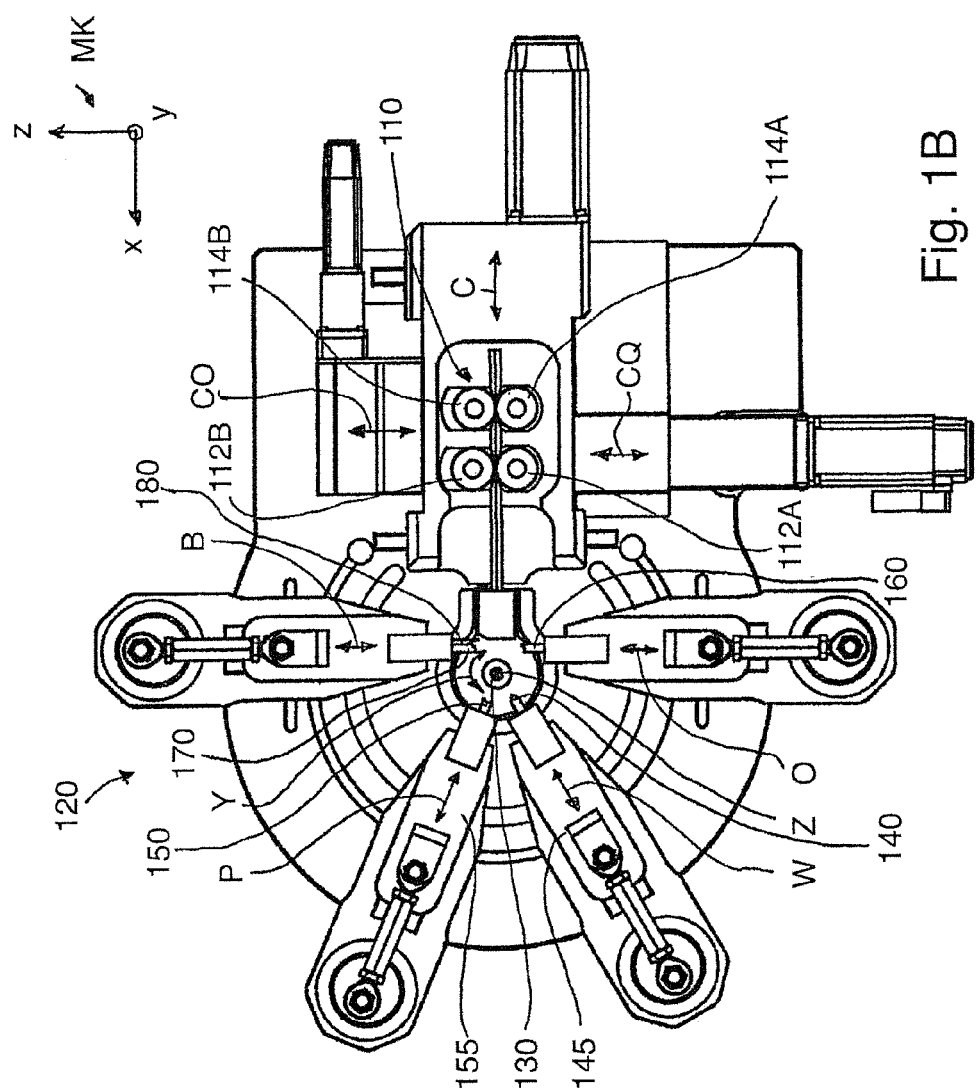

On the right-hand side, the schematic overview in FIG. 1A shows key mechanical and electromechanical components of a forming machine 100 designed for the manufacture of spiral springs from flat wire-like or strip-like semi-finished product and is accordingly also referred to as a spiral spring machine 100. FIG. 1B shows these components again in detail for reasons of clarity. The forming machine controlled by computer numerical control has a plurality of controllable machine axes, a drive system with a plurality of electric drives that drive the machine axes and a control device 200 for the coordinated control of movements of the machine axes during operation.

The fabrication process for a spiral spring having a specific geometry and spring properties is controlled by a computer-readable control program specific to the fabrication process, the movements of the machine axes provided for manufacture of the molded part and the sequence thereof being stored in the control program in the form of NC sets and/or in the form of path/time tables or corresponding data sets. The system that programs the forming machine and the movements of the machine axes has an operator unit 300 shown schematically on the left-hand side in FIG. 1A, which serves as an interface to the machine operator. The operator unit has a display unit 310 in the form of a graphics screen controlled by a computer unit (not illustrated). One or more input units can connect to the computer unit, for example, a keyboard 320 and a mouse 330. If the display device is formed as a touchscreen, some or all separate input units can also be omitted.

The operator unit 300 connects to the control device 200 via a bidirectional data line path 210 so that information can be transferred from the computer unit of the operator unit to the control device and information from the control device can be displayed on the display unit 310, after processing if necessary.

The forming machine has a draw-in device 110 having two pairs of draw-in rolls 112A, 112B and 114A, 114B arranged one above the other, successive portions of a flat wire or strip coming from a material store (not shown) and guided by a straightening unit (likewise not shown) being fed with a numerically controlled advance speed profile into the region of a forming device 120 as a result of the paired rotation of the pairs of draw-in rolls in opposite directions. The flat wire or the strip is a wire-like material having a relatively large width compared to its thickness. This material will be referred to generally hereinafter as "wire."

In the example, the forming machine has a right-angled machine coordinate system MK denoted by the lowercase letters x, y and z and having a vertical z-axis and horizontal x- and y-axes. In the example, the x-axis runs parallel to the draw-in direction or feed direction, defined by the draw-in device 110, of the as yet unbent wire. A distinction is to be made between the machine-fixed coordinate axes and the machine axes driven in a controlled manner and yet to be explained hereinafter, which are denoted by capital letters in each case. For example, the C-axis is responsible for the advance or drawing in of the as yet unbent wire in the direction of the forming device 120.

The wire fed into the operating range of the forming device 120 is formed with the aid of numerically controlled tools of the forming device into a planar spiral spring. The following tools and corresponding machine axes are provided in the configuration shown:

A winding mandrel 130 illustrated particularly clearly in FIG. 7 is rotatable about a horizontal axis of rotation 135 extending parallel to the y-axis and is axially displaceable relative to this axis. The machine axis responsible for the rotation of the winding mandrel is the Y-axis, and the axial displacement of the winding mandrel is achieved by the Z-axis. The winding mandrel has a central transverse slit 132, into which a starting end portion of the fed wire 115 is introduced before a spiral spring is wound, fixed by rotating the winding mandrel and thus held in place during the further rotation.

A threading tool 140 having a wedge-shaped tip is slid into the slit of the winding mandrel with the aid of a first slide 145 in the region directly in front of the winding mandrel to assist the threading of the start of the wire. The respective translatory axis running substantially radially to the Y-axis is the W-axis.

A fixing tool 150 having a concave cylindrical pressing contour is displaced with the aid of a second slide 155 in the direction of the spring wound about the winding mandrel. The fixing tool is used in the end phase of the winding process to press together and fix the wound spiral spring so that it does not uncoil suddenly when the spring is separated from the fed wire. The translatory machine axis running substantially radially to the axis of rotation of the winding mandrel is the P-axis.

In the example, a terminal portion bent a number of times is provided at the outer end of the spiral spring to be produced and produced with the aid of two further machine axes. A first bending tool 160 is used as a female mold and advanced vertically from below approximately tangentially to the axis of rotation of the winding mandrel in the direction of the wire. The respective translatory axis is the O-axis.

At the same time, a second bending tool 170 formed as a male mold is displaced downwardly from the opposite side with the aid of a further translatory axis (B-axis) to form the bent end portion. At the same time, the B-axis moves a cutting tool 180 mounted beside the second bending tool and used to separate the spiral spring from the fed wire.

The rolls of each draw-in roll pair may be brought towards one another or moved away from one another selectively. If the rolls are brought towards one another to a minimal spacing, they engage non-positively with the intermediate wire portion and the wire portion is conveyed in the direction of the forming tools by rotation of the draw-in rolls. If the start of the wire is introduced into the slit in the winding mandrel and the mandrel is rotated until it securely fixes the start of the wire, the pairs of draw-in rolls can be opened so that the wire is advanced further since the rotating winding mandrel pulls the wire in the direction of the winding mandrel. The axis for the roll weighting is called the CO-axis and causes a linear movement of the upper draw-in rolls 112B, 114B at right angles to the direction of feed of the wire or parallel to the z-direction.

In the example shown, the entire draw-in device can also be moved vertically, that is to say parallel to the z-direction or at right angles to the direction of feed of the wire, in a controlled manner. The respective translator machine axis is the CQ-axis. One possibility for use is explained in conjunction with FIG. 7.

With this configuration, the course of movement of the machine axes during a movement cycle for fabrication of a spiral spring can be controlled as follows, for example.

With the aid of the rotating draw-in rolls (C-axis) rotating pairwise in opposite directions and located in their position of engagement, the wire is first conveyed in the direction of the winding mandrel until a wire start portion is slid into the transverse slit in the winding mandrel. This threading movement can be assisted by the threading tool 140. If the axis (W-axis) of the threading tool is programmed, the threading tool can be moved by the drive of the W-axis so close to the winding mandrel in the phase before feeding of the start of the wire into the slit that a swerving of the advanced start of the wire is mechanically prevented and the start of the wire is therefore fed in any case into the transverse slit in the winding mandrel. This insertion aid may also be omitted in other processes.

As soon as the rotating winding mandrel has securely grasped the wire, the upper draw-in rollers 112B, 114B can be raised at the same time by the CO-axis and, therefore, the wire is advanced further merely by the rotating winding mandrel. It is also possible to leave the draw-in rolls in engagement with the wire and to rotate them further in accordance with the desired advance profile.

If the winding process is completed after a predefined number of rotations of the winding mandrel, the winding mandrel is wound back slightly to relieve the wire material of pressure. In addition, the fixing tool 150 is placed against the outer periphery of the spring by an advancing movement of the P-axis and secures the spring against a sudden uncoiling during the subsequent processing steps.

In the end phase of the bending movement cycle, the two bending tools 170, 180 shaped complementarily move towards one another simultaneously from opposite directions with the aid of the O-axis and the B-axis. The finished, wound spiral spring is first separated from the wire by being cut by the cutting tool 180. The bending tools 160, 170 then shape the intricately bent end portion of the spiral spring in a forming process, either directly after the cutting operation or with a temporal overlap. The winding mandrel is then withdrawn by the Z-axis, whereby the finished spring is slid off.

An identical, next movement cycle can then be started, by which the next spiral spring is produced.

Some successive phases of the programming of the control device for such a spring production process or a similar spring production process will now be explained on the basis of FIGS. 2 to 6 with reference to a simplified example. In this case, the term "programming" includes not only the final steps in the computer-assisted creation of the NC control program, but also the inputs and selections to be undertaken by the operator, with which machine axes can be selected and movement parameters and coordination parameters for the axial movements can be input and defined.

In the example, the programming dialogue is controlled by a program module called the "course editor" and displayed and allows the operator of the forming machine to undertake and/or to check all inputs necessary for definition of the course of movement of the machine axes in an intuitively comprehensible input environment. Data which is made available to the control device 200 following input via the data line path 210 is compiled and processed via the course editor, the NC control program containing corresponding inputs used for the control process being produced in the control device.

The course editor of the programming system produces a plurality of clearly structured menus on the screen of the display unit 310. An axis selection menu AAM, which is always displayed when the course editor is selected, contains graphical symbols for the programmable machine axes of the forming machine. In the example, each machine axis is symbolized by a horizontal rectangular field in which an axis identification symbol (for example, the capital letter C for the draw-in axis) appears to the left. In the nomenclature of the axis sequence menu, the lowermost input field of the axis selection menu represents the "M-axis." The M-axis is not an electric-mechanical machine axis. Digital switching functions such as axial movements can be included in the sequence via the "M-axis."

The input fields for all programmable machine axes (and the M-axis) are displayed one above the other in a common illustration based on a common time axis ZA. In the example, the time axis displays a relative time measure, proportional to the course time, in the unit of milliseconds (ms).

The figure "100" on the time axis ZA does not generally correspond to an absolute period of 100 ms (in real time), but is based on a reference course in which the forming machine operates at maximum operating speed, corresponding to a value of 100% of operating speed. If the movement cycle is executed at a slower operating speed, the figure 100 ms corresponds to a correspondingly longer period. For example, if the machine is operated at half the maximum operating speed, the figure "100 ms" corresponds to an actual period of 200 ms.

Input/display fields for parameters of an axial movement menu ABM and an axial movement coordination menu ABKM are clearly displayed one above the other to the right, beside the axis selection menu. The axial movement menu contains options for the input of movement parameters for definition of a course of movement of a selected machine axis. The input/display fields denoted ABM1 to ABM5 belong to the axial movement menu. The input/display fields denoted ABKM1 to ABKM4 belong to the axial movement coordination menu.

An axial movement identification ABI is also displayed above the aforementioned display/input fields and indicates the name of the currently selected machine axis (in this case the P-axis) and the number of the selected movement (in this case 0). The "0" refers to the first movement of the selected axis during a movement cycle, whilst the number "1" would refer to the second movement of the same axis and the like.

The current position value of a selected axial movement (in this case the first movement C-0 of the C-axis) at a selected moment on the time axis ZA is indicated in the display field AW, which is characterized in the example by the notation "curr. Value," wherein this selected moment is displayed by the position of the cursor CU, which in the example is represented by a dashed line intersecting all axis fields at right angles.

The meaning of the individual display/input fields of the menus will be explained hereinafter on the basis of an exemplary input dialogue in conjunction with FIGS. 2 to 6.

The course of movement to be programmed is to be started with a movement of the C-axis, that is to say with the feed of a new wire portion through the draw-in device 110. For this purpose, the C-axis to be programmed is first selected by the operator by mouse click, by keys or key sequences of the keyboard, or in another way. As soon as an input for selecting the C-axis to be programmed has been received by the system, the system displays a colored, rectangular movement block BB in the axis selection menu AAM, which represents the axial movement to be programmed or the programmed axial movement. The index "0" in the movement block shows that this is the first movement of the C-axis during the movement cycle. To the right, the available input/display fields of the axial movement menu ABM and of the axial movement coordination menu are displayed automatically together with the axial movement identification ("C-0" in this case).

The start position of the axial movement and the end position of the axial movement are now defined in a predefined position unit by the input field ABM1 for the start value and ABM2 for the end value. In the example of a linear advance, the position unit is a length unit (mm in this case) and represents the advance of the wire. If another language and/or measure were selected in the previous configuration dialogues, the position unit of inches for a length movement could also appear here, for example. In the example, the operator has input an end value of 100 mm.

A particular feature of this type of input for programming lies in the fact that the period for an axial movement is not predefined, but emerges as a derived variable from the setting input by the operator and/or predefined by the programming system. To this end, parameters which define the position change during the movement of the programmed machine axis are predefined or can be input in the display/input fields ABM3 to ABM5. In the example, the axial movement is to have a speed of 100% of the predefined maximum speed and an acceleration of 100% of the predefined maximum acceleration and is to take place according to a specific movement profile. This is predefined as standard as a movement law according to a quadratic parabola ("quadrat" for short) to obtain a smooth transition between phases of different movement speed. Depending on the authorization profile with which the machine operator may work, the values for speed, acceleration and movement law may be predefined in a fixed, unchangeable manner by the machine or may still be changed by the operator, for example, in an expert mode.

Since the example concerns the first axial movement in time of the entire course of movement or movement cycle, the displayed values in the fields ABKM1 to ABKM4 of the axial movement coordination menu still have no effect in this case.

Figure 2:
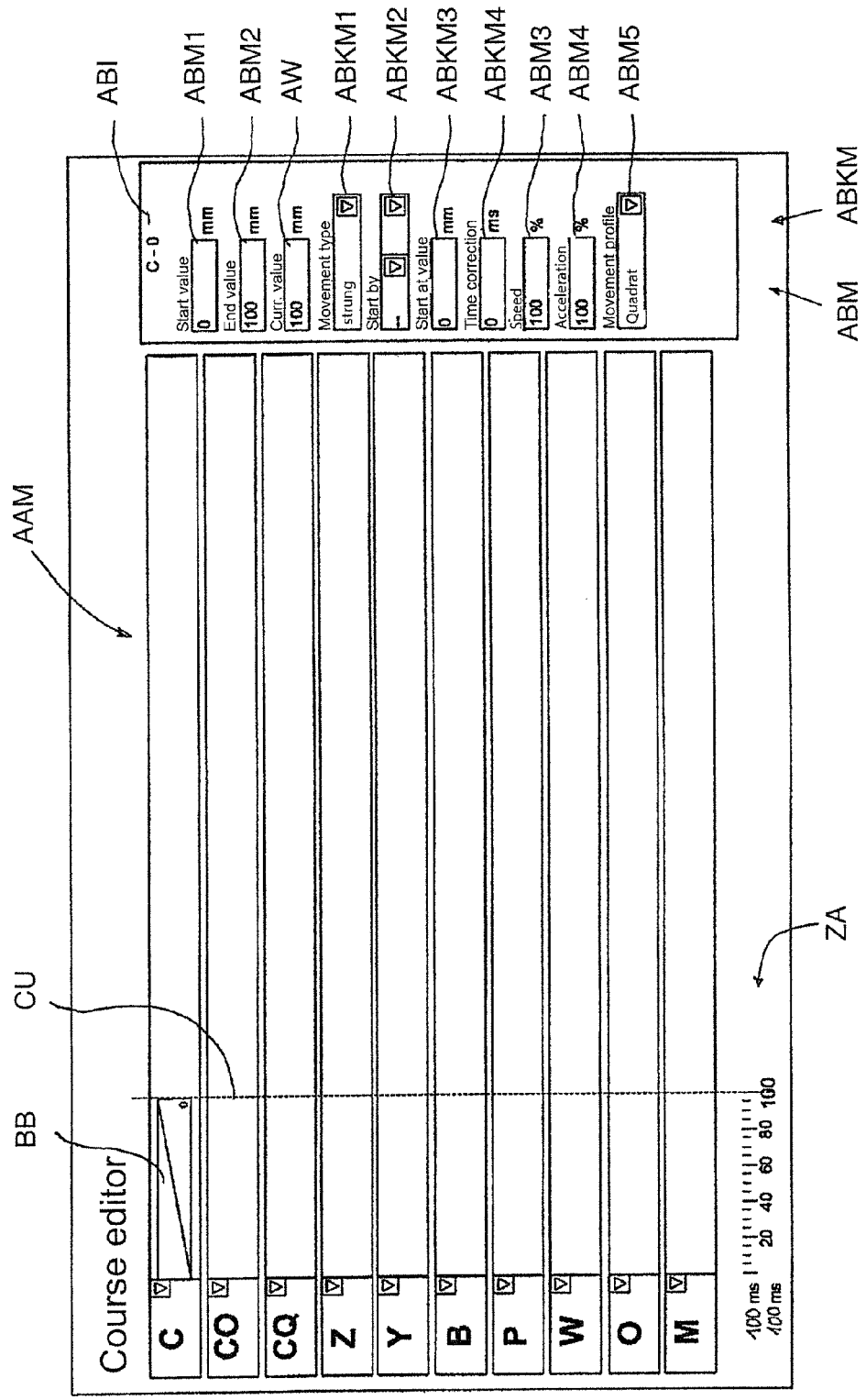
FIGS. 2 to 6 each show views of a portion of the screen display of an operator unit in successive phases of an input dialogue for programming the coordinated movement of machine axes.

The axial movement of the C-axis input according to FIG. 2 lasts for 100 ms at maximum operating speed of the forming machine. This emerges from the current cursor position, which corresponds to the end value of the programmed axial movement (in this case the end value is 100 mm).

The movement of the C-axis defined by the movement parameters is displayed graphically in the movement block BB in the form of a path/time diagram normalized to a reference level. In a time-correct manner, this diagram lies between the start time (0 ms) and 100 ms based on a common time axis ZA.

Figure 3:
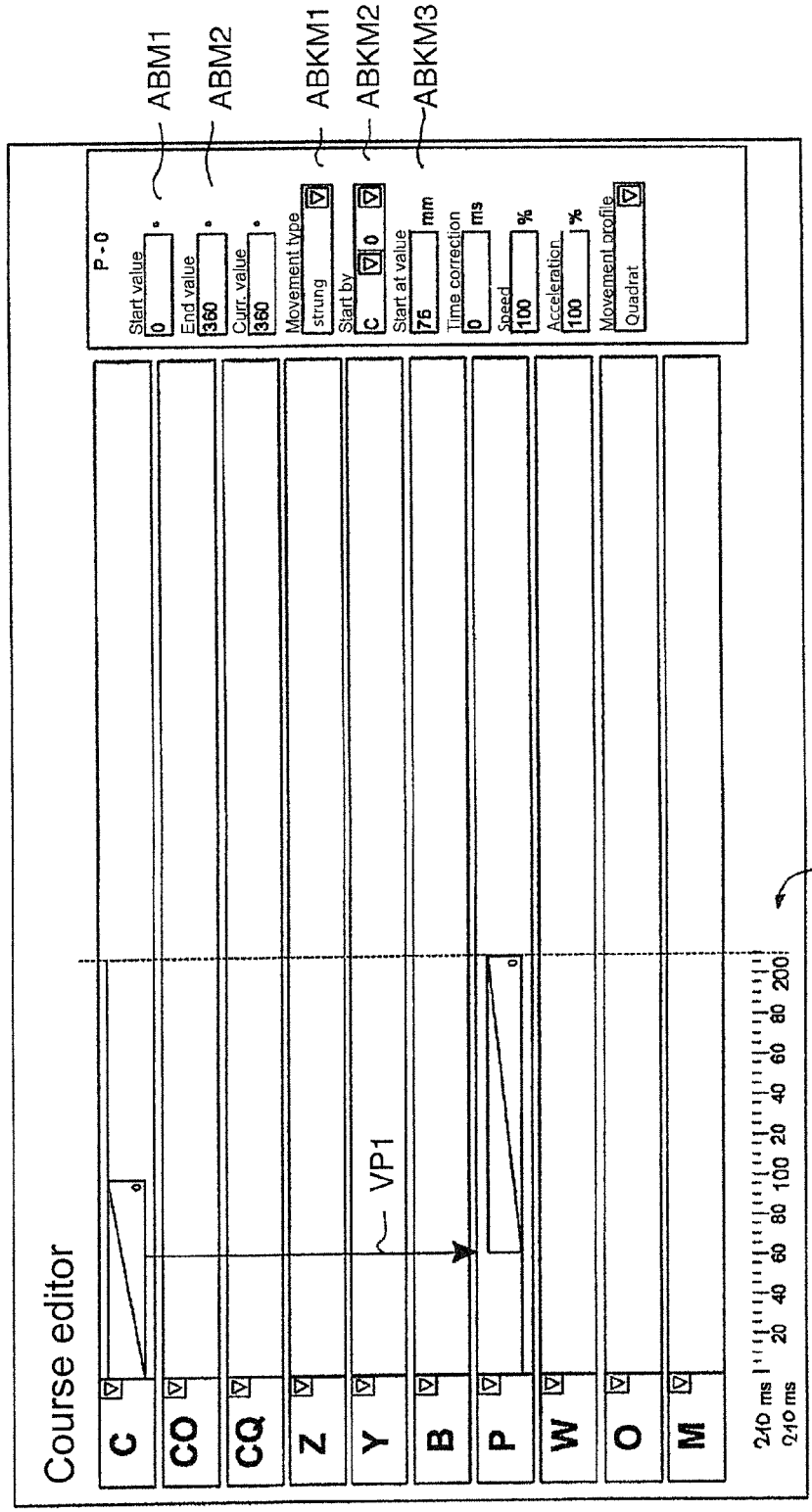
Figure 4:
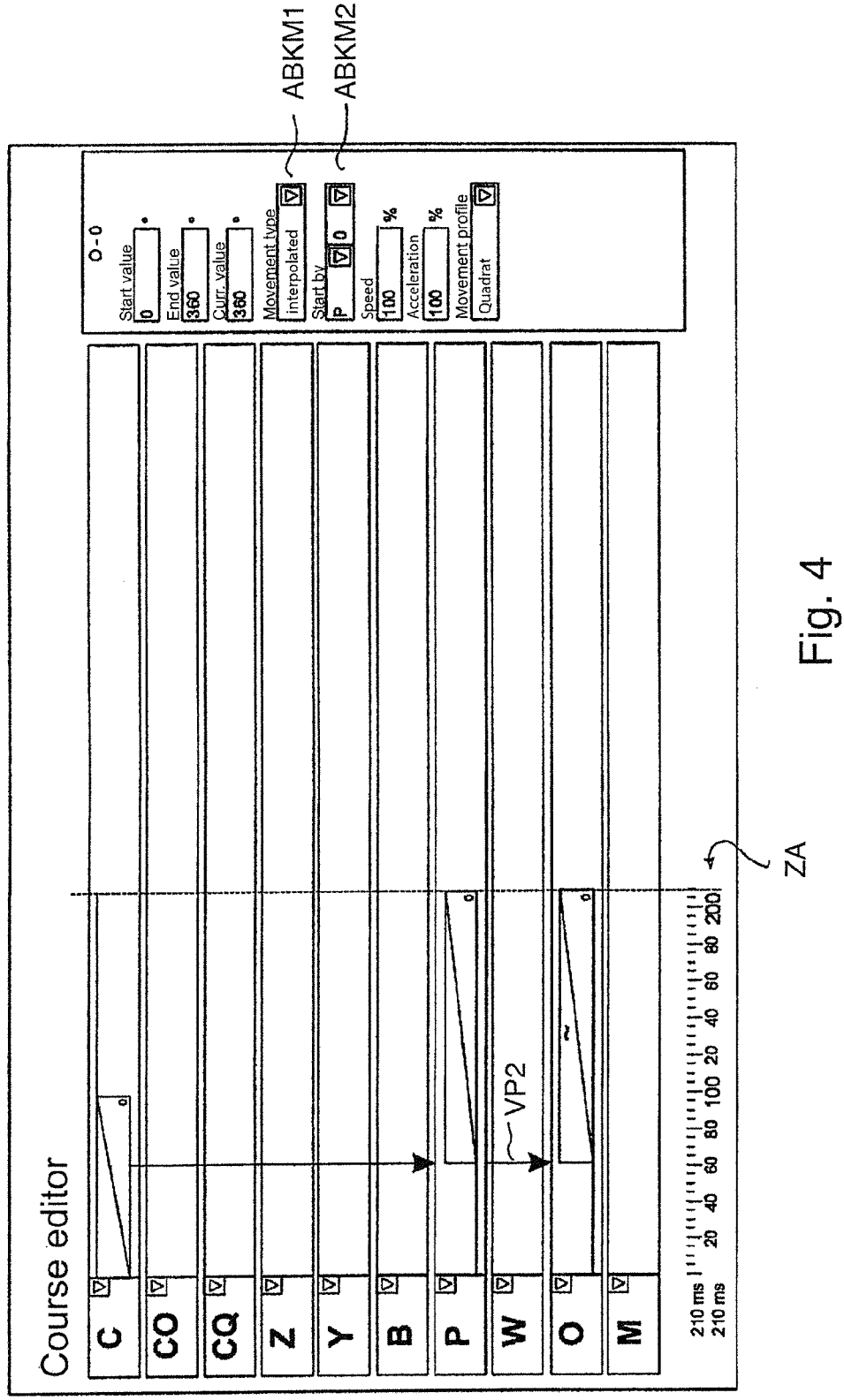
Figure 5:
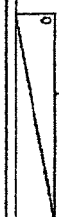

FIG. 3 shows the display of the course editor during the input for programming the P-axis, the movement of which according to specific conditions predefinable by the inputs is to be attached to the movement of the C-axis already input. This first movement of the P-axis (axial movement identification P-0) is defined by a rotational movement between a start value 0° and an end value 360°.

In the forming machine 100, the P-axis produces a translatory movement of the fixing tool, wherein the sliding carriage carrying the tool is driven by a slider crank mechanism which converts a rotational movement on the drive side into a linear movement of the sliding carriage on the output side. With machine axes of this type, it is possible to select with the system whether the machine axis is based on the rotational movement (for example, of the crank) and is therefore to be input or programmed in an angular unit, or whether it is based on a translatory movement (for example, of a connecting rod) and is therefore to be input or programmed in a length unit (for example, mm or inches). A calculation program then establishes automatically from the predefined mechanical data (for example, crank radius, connecting rod length, transmission and the like) the necessary movement of the drive. In this case the programming system is largely adapted to the knowledge of the machine operator.

In accordance with the notions of the machine operator, the P-axis is to start at the moment at which the C-axis has reached the position of 75 mm. The operator first inputs the start and end values of the axial movement via the fields ABM1 and ABM2. The corresponding movement type (stringing of axial movements in this case) is also selected from a drop-out menu in the field ABKM1. The axial movement with which the current movement of the P-axis is to be strung can be selected or input in the field ABKM2 ("start by") with the aid of a drop-out menu. In this case all axial movements already input or programmed are automatically offered for selection. In the example, it is the first movement of the C-axis, characterized by the axis symbol C and the movement number 0. The position of the movement of the C-axis at which the strung movement of the P-axis is to start (in this case 75 mm) is indicated by the field ABKM3 ("start at value"). In this case a vertical first linking arrow VP1, which intuitively shows the machine operator that the programmed movement of the P-axis is strung with the movement of the C-axis and that the movement of the P-axis is started before the movement of the C-axis has been completed, automatically appears on the display in accordance with these specifications. As can be seen from the cursor position, these two strung movements would be completed after approximately 240 ms if the machine were operated at 100% machine speed.

In accordance with the course of movement to be programmed in the example, the O-axis is also to be moved at the same time as the movement of the P-axis. The input of the parameters for this axial movement is explained on the basis of FIG. 4. For example, the operator first selects the symbol for the O-axis using the mouse so that the display/input fields of the axis movement menu and of the axial movement coordination menu for the first movement of the O-axis (O-0) are automatically displayed on the right. This axial movement is also to be defined by a complete rotation between the start value 0° and the end value 360°. The predefined standard settings apply for speed, acceleration and movement profile. Since this is to be an interpolated movement with the P-axis, the movement type "interpolated" is selected in the field ABKM1 and the start is selected by the first movement of the P-axis (P-0) in the field ABKM2. A second linking arrow VP2 then appears on the display from the start of the movement block of the P-axis to the start of the movement block of the O-axis. The interpolated movement is characterized in the movement block of the O-axis by a tilde (~).

In accordance with the definition of the example, interpolated movements are characterized in that they start at the same moment and end at the same moment, in that acceleration phases are of equal length, in that any possible constant start phases are likewise of equal length, and in that the braking phases are also of equal length. Interpolated movements are thus coupled with one another on the time axis, wherein the absolute values for the position changes (axial paths) and the accelerations are automatically adapted accordingly. If the movement of an axis is interpolated with the movement of another axis, this type of linking may lead to the fact that one of the interpolated movements or both interpolated axial movements are changed in terms of their absolute duration such that a movement profile which is optimal for the machine results for both interpolated movements.

Alternatively or in addition to the linear interpolation between machine axes explained in this instance, it is also possible in other examples to undertake a non-linear interpolation between machine axes.

In the next step of the course programming (FIG. 5), a movement of the Z-axis is to be attached to the movement of the P-axis in accordance with the third linking arrow V3. The first movement of the Z-axis (Z-0) is to extend from the start value 0 mm to the end value 5 mm and is to start when the P-axis reaches its end value of 360°. This is a reversing axial movement.

In the example, three digital switching functions are activated during the movement of the Z-axis. In principle, these are input or programmed similarly to an axial movement in an operator-friendly manner. The "M-axis" appearing at the bottom is used to define the moment or moments of activation of this function as well as the type of function. Since no actual axial movement is to be programmed for this purpose, the display/input fields of the axial movement menu and the field displaying the current value are not displayed. In addition to the display/input fields ABKM2, ABKM3 and ABKM4 of the axial movement coordination menu, display/input fields M1, M2 and M3 are also displayed for definition of machine functions.

Figure 6:
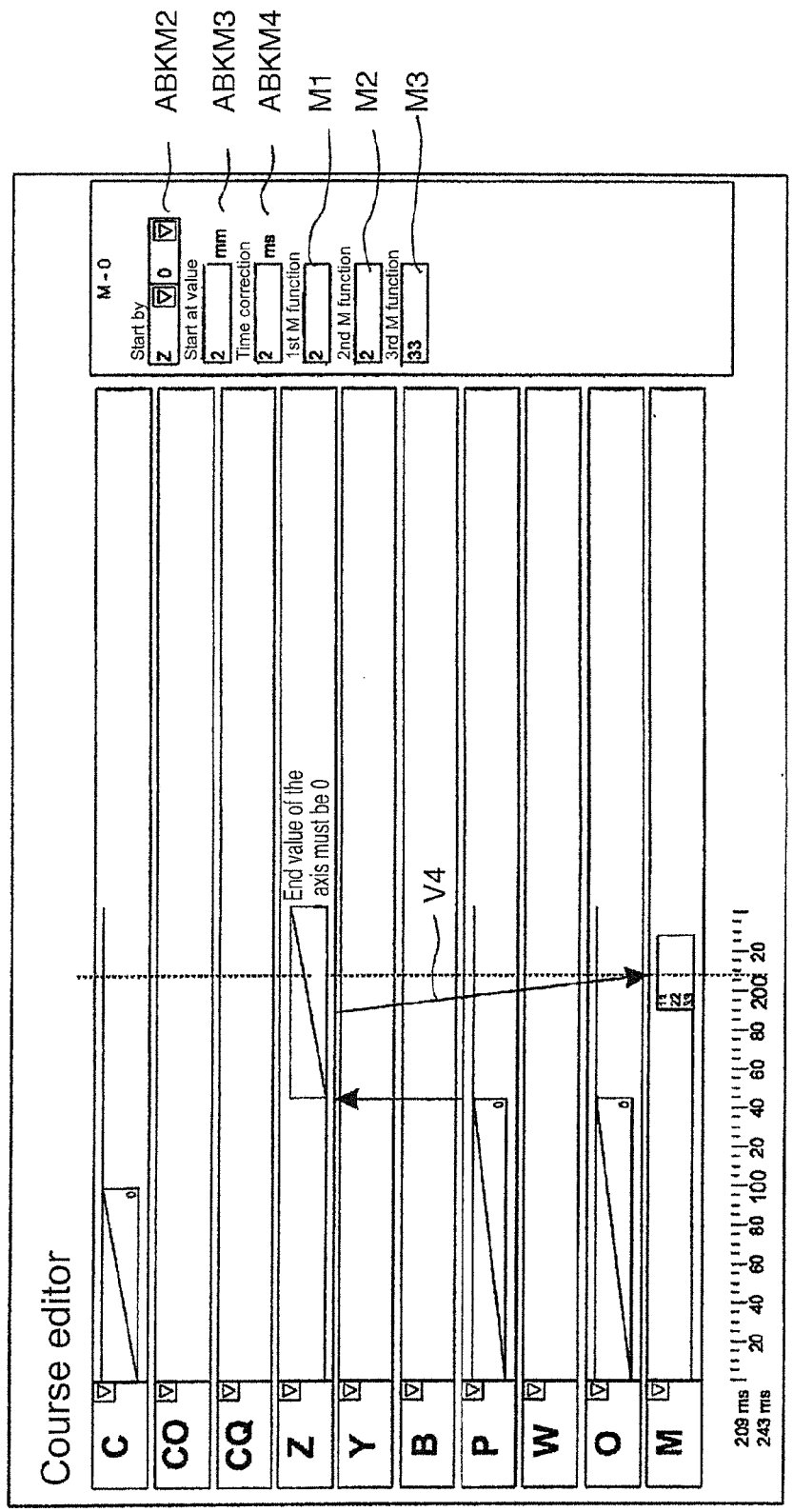

According to the procedure in FIG. 6, three digital switching functions (M functions) with the notation 2 (twice) or 33 are included at position 2 mm of the Z-axis. According to the desired sequence, these are not to be triggered or activated precisely when the Z-axis reaches the position 2 mm however, but activation is to take place in a time-delayed manner, 2 ms after this position has been reached. The value "2" (ms) is input in the input/display field ABKM4 (time correction) for this purpose. The receipt of this input leads to a corresponding link, which is illustrated graphically by an inclined, fourth linking arrow VP4. The fourth linking arrow VP4 appears inclined due to the temporal delay of the control. The numbers of the corresponding machine functions appear in the function block FB.

For example, digital actuators such as magnets, lights, actuators for sorting flaps, or the like can be controlled by a digital function block. It is also possible to activate trigger signals for sensors or, for example, to determine the moment in time of an integrated measurement.

Once all inputs and/or selection actions for a course of movement have been terminated, a data set is generated which represents the entire course of movement of the programmed movement. For example, the data set can be generated in the form of a path/time table and transferred to the control device. Such a data set, which corresponds to an s-t diagram, can be generated for each drive active during the entire course. These data sets can be calculated at the same time as the input of an axial movement or once the entire input for all machine axes has been completed.

Subsequent corrections or optimizations of the course of movement can be made quickly and easily with the aid of the course editor. For example, the temporal sequence of the individual courses of movement can be changed to control downtime, that is to say to control, on the whole, the interaction of the movements without changing the parameters which are relevant to the shape of the formed part such that cycle time is shortened and productivity can thus be increased. If the course is initially set up such that the desired geometry of the parts is produced, the overall course can then be controlled, for example, by fitting axial movements in one another and/or by attaching one axial movement to another axial movement. In particular, a sequence can be controlled by "displaced" programmed axial movements in relation to the time axis, wherein the displacement may be effected with the aid of a mouse, or with the aid of a finger in the case of touch-sensitive display devices (touchscreens).

The programming method and the programming system offer the machine operator great flexibility when shaping the programmed course of movement. In principle, it may thus be that a course of movement is programmed, during the course of which one or more drives of the drive system may be overloaded temporarily. For example, a course of movement may thus be created such that a drive is accelerated and decelerated a number of times within a movement cycle and, therefore, the drive could overheat in some circumstances, upon which a safety device within the drive is actuated and switches off the drive. To avoid problems of this type, in preferred examples a test run is carried out after completion of programming of a course of movement, drives of the drive system are monitored for overload during the test run, an overload signal is produced if a drive experiences a state of overload during the test run, and the programmed course of movement is optimized on the basis of the overload signal. In this case, the control changes the control program such that the established states of overload no longer occur during a course of movement controlled on this basis.

In some examples, an overload display which preferably functions in a drive-selective manner and accordingly shows the operator which drive has experienced a state of overload during which phase of its movements is controlled on the basis of the overload signal. For example, this may be achieved since the movement block of an axis in which a state of overload has occurred is highlighted by the course editor by color and/or by flashing or the like in the screen display.

The operator can then respond and modify the course of movement such that the causes of the state of overload are overcome. To this end, the operating speed can be reduced, for example, so that the entire movement cycle is carried out more slowly. It is also possible to change the movement law of the drive at risk, whereby only the period for the movement at risk is extended if necessary.

Preferably, the course of movement is controlled without any manipulation of the system by the operator since the course of movement is automatically changed in response to an overload signal such that the entire course of movement is carried out without any occurrence of a state of overload whilst still retaining the operating result (for example, a molded part of specific geometry) produced by the course of movement. To this end, the control can reduce the operating speed, for example, with an effect on the entire process, or change the acceleration and/or the movement law in the drive and movement in question.

In some examples the monitoring system monitors the driving torque or the progression of driving torque of the drives within a movement cycle to monitor any overloading of drives, and an overload signal is generated if, in a drive, the driving torque temporarily lies above the permissible nominal torque of the drive. The driving torque can be established by provided possibilities for evaluation of the drive or indirectly on the basis of other suitable parameters, such as the power consumption of the drive.

To carry out the test run, a test part is normally fabricated after completion of the programming of the course of movement so that the drives can be monitored during an actual course of movement. A plurality of test parts may also be fabricated if necessary to improve the validity of the check and to rule out random overload displays.

It is also possible to carry out a "virtual test run," wherein, on the basis of available data regarding the course of movement and relevant values of the drive system, it is established whether a drive is expected to be loaded critically during the course of movement. The relationship $\vec{M}=\vec{J}*\alpha$ between torque $\vec{M}$, moment of inertia $\vec{J}$, and angular acceleration $\alpha$ can be used. Since the moment of inertia $\vec{J}$ is known, the effective angular acceleration $\alpha_{\mathit{eff}}$ and therefore the effective torque $\vec{M}_{\mathit{eff}}$ can be established from the movement profile and compared with the nominal torque $\vec{M}_N$. For example, a correction can be made, and the effective torque reaches or exceeds the nominal torque when the condition $\vec{M}_{eff} \geq \vec{M}_N$ is met.

A possibility for use of the adjustable draw-in device 110 which can be moved linearly in a controlled manner with the aid of the controlled translatory CQ-axis at right angles to the draw-in direction or feed direction is explained on the basis of FIG. 7. To the right, FIGS. 7A and 7B each show the outlet-side draw-in rolls 112A, 112B of the draw-in device 110. These are mounted on a support 116 which can be moved vertically with the aid of the CQ-axis. A guide device 118 having two parallel guide rails is also attached to the support 116 after the draw-in rolls in the direction of conveyance, the guide rails guiding the conveyed wire in a straight line as it is advanced in the direction of the forming device 120.

In each case, the winding mandrel 130 provided with a transverse slit 132 is shown to the left and can be rotated about the axis of rotation 135 of the winding mandrel in a predefinable rotational direction with the aid of the Y-axis and can additionally be displaced parallel to the axis of rotation 135 with the aid of the Z-axis, for example, to slide off the finished spring by withdrawing the winding mandrel.

FIG. 7A shows the draw-in device 110 in a basic position, in which the feed direction 125 defined by the vertical position of the draw-in rolls and the guide rails extends exactly radially to the axis of rotation 135 of the winding mandrel. This basic position is approached, for example, for the threading of the leading end of the wire into the transverse slit 132, for which purpose the winding mandrel is rotated such that the transverse slit 132 extends substantially parallel to the feed direction (or parallel to the x-axis of the machine coordinate system MK).

When, after completion of the threading process, windings of the spiral spring start to be produced by rotation of the winding mandrel, the outer diameter of the spiral spring changes gradually with continuous wire feed and an increasing number of windings. If, in this case, the draw-in device 110 were to remain in its basic position, the wire, after exiting the guide device 118, would be subjected to an ever-increasing bending load with increasing diameter of the spiral spring, before it came to rest against the outer region of the previous winding.

To avoid plastic deformation of the wire in this region, it is possible to keep the distance between the draw-in device/guide rails and the winding mandrel at such a level in relation to the maximum diameter of the spiral spring, that only a slight elastic bending of the wire occurs at all diameters, without plastic deformation.

With the aid of the draw-in assembly which can be displaced during creation of the spiral spring, it is possible for the wire to remain practically unbent between the exit from the guide device 118 and the resting against the outer face of the developing spiral spring. In the example the advancing movement of the CQ-axis during the winding of the spiral spring is programmed such that the feed direction 125 of the wire defined by the draw-in device 110 extends substantially tangentially to the outer periphery of the developing spiral spring during all phases of the winding process. As can be seen in FIG. 7B, the wire is thus hardly bent between the exit from the guide device 118 and the winding at the periphery of the spiral spring, and therefore plastic deformation is reliably avoided in this region.

An advantage of this example is that springs of high quality can be produced. Another advantage is that a very space-saving and compact design is possible, since the exit of the draw-in system (in this case the exit from the guide rails 118) can be brought very close to the region of the winding mandrel.

In other examples not illustrated, the draw-in device can be pivoted as a whole in a controlled manner by a corresponding machine axis about a pivot axis extending parallel to the axis of rotation 135 of the winding mandrel 130. As a result, the fed wire can also be guided substantially tangentially to the winding of the spiral spring, which is becoming increasingly larger in terms of diameter.

We thus disclose a forming machine having a draw-in device that draws an elongate workpiece (in this case a wire) into the region of the forming device, wherein the position and/or orientation of the draw-in device defines a feed direction and the draw-in device can be adjusted with the aid of a controlled machine axis (in this case the CQ-axis). The adjustable draw-in assembly can be used when setting up the machine for a forming process to orientate the draw-in device favorably in relation to the tools of the forming device. Specific advantages emerge from that fact that the machine can be controlled such that the draw-in assembly is adjusted during the production of the spring, for example, to adapt the draw-in device to a winding diameter which is ever-changing during production of the spring. The adaptation may be carried out in particular such that the feed device always extends substantially tangentially to the winding just being produced.

Some advantages have been explained on the basis of FIG. 7 with reference to the example of production of a planar spiral spring. An adjustable draw-in assembly can also be provided in other spring machines, however, for example, in a spring machine that produces coil springs by spring winding, that is to say in a spring winding machine. In this case, an adjustable draw-in device can be used, for example, if coil springs having a winding diameter which varies along the axial direction of the spring are to be produced, for example, conical coil springs or barrel-shaped coil springs. In this case, too, the feed direction defined by the draw-in device can be changed gradually, by displacing the draw-in device in a direction of displacement extending at right angles to the feed direction or by pivoting the draw-in device about a pivot axis extending parallel to the spring axis, for example, such that the feed direction always extends substantially tangentially to the winding just being produced, even if the winding diameter changes during manufacture of the spring.

The draw-in device which is adjustable in a controlled manner and explained particularly on the basis of FIG. 7 can be used in cooperation with the programming system. However, this is equally an advantageous technical measure independent of this system and can also be implemented in forming machines which in particular do not have the specific programming system.

The method and system of programming the control have been explained by way of example in conjunction with a multiaxis forming machine. The possibilities for application of the method and the system are not restricted to this, however. In principle, an application in other numerically controlled shaping or processing machines equipped with a plurality of controllable machine axes is also possible.

The invention claimed is:

1. A method of programming a control of a forming machine, which is a bending machine that bends wire or pipe, the forming machine having a plurality of controllable machine axes, a control device for coordinated control of axial movements of the machine axes, and an operator unit with an associated display unit that operates the forming machine, comprising:

displaying an axis selection menu (AAM) with graphical symbols for machine axes of the forming machine;
receiving an input for selecting a machine axis to be programmed;
displaying an axial movement menu (ABM) containing options for the input of movement parameters for definition of a course of movement of the axial movement of the selected machine axis;
receiving inputs for definition of movement parameters;
displaying an axial movement coordination menu (ABKM) containing options for the input of coordination parameters for a use in coordinating courses of movement of the axial movements of machine axes; and
receiving inputs for definition of values for coordination parameters.

2. The method according to claim 1, wherein the axial movement menu contains position-based movement parameters exclusively, the duration of an axial movement emerging as a derived variable from the input movement parameters.

3. The method according to claim 1, wherein the course of an axial movement is defined by a start value for the start position at the start of the axial movement, an end value for the end position at the end of the axial movement, and one or more movement parameters for the change in position to be passed through between the start position and the end position.

4. The method according to claim 3, wherein a speed value and an acceleration value are received or generated for definition of a position change, the speed value and/or the acceleration value preferably being received or generated as a percentage of a corresponding maximum speed value or maximum acceleration value respectively.

5. The method according to claim 1, wherein a movement law menu containing a plurality of options for selection and input of a movement law type is displayed, the movement law type being selected from the group having a quadratic parabola, a polynomial of fifth order and a polynomial of eighth order.

6. The method according to claim 1, wherein a display/input field is displayed for the display and/or input of a movement parameter and the movement parameter is received or displayed in the form of a numerical input value or in the form of a selection of an input from a list of input options, the display/input field preferably being displayed together with an automatically created unit for the input value.

7. The method according to claim 1, wherein a movement start menu containing at least one option that determines a condition for the start of an axial movement is displayed or offered in the axial movement coordination menu, all axial movements already input being offered for selection of a linking to an axial movement which has already been input, an input field being displayed or offered which allows the position of the linked axial movement at which the currently programmed axial movement is to start to be defined, and/or the movement start menu containing an option in accordance with which a movement starts directly at the temporal origin of the entire course.

8. The method according to claim 1, wherein a time correction field for the input of a time correction value is displayed in the axial movement coordination menu, it being possible to generate a temporal displacement of the start position of the currently programmed axial movement by inputting a finite time correction value.

9. The method according to claim 1, wherein a machine function axis is displayed in the axis selection menu in addition to the programmable machine axes and allows a definition of the activation of a machine function at a suitable point, similarly to the definition of an axial movement, a machine function start menu containing at least one option to define a condition for the start of a machine function preferably being displayed or offered when selecting the machine function axis.

10. The method according to claim 1, wherein a movement sequence menu containing at least one option for the input of a reference to another axial movement is displayed or offered, the options containing one or more of the following options:
(1) a stringing of axial movements such that the axial movement of one machine axis is started once the axial movement of a preceding machine axis has been performed completely or in part;
(2) an interpolation of axial movements such that axial movements of a plurality of machine axes extend parallel to one another over time at a specific ratio to one another, movement phases of interpolated axial movements being of equal length;
(3) a continuous axial movement such that the machine axis is moved at constant speed during the entire production cycle.

11. The method according to claim 1, wherein a corresponding axial movement menu (ABM) and a corresponding axial movement coordination menu (ABKM) are automatically displayed in response to an input for selecting a machine axis to be programmed, the axis selection menu (AAM) being displayed together with the axial movement menu and the axial movement coordination menu of the selected machine axis, the selected machine axis being highlighted in the axis selection menu by a marking.

12. The method according to claim 1, wherein the movement of the machine axis defined by the movement parameters is displayed graphically in the axis selection menu in response to an input for definition of movement parameters, movement being displayed in the form of a field containing a normalized path/time diagram displayed in a time-correct manner based on a common time axis (ZA).

13. The method according to claim 1, wherein axial movements and links between axial movements are displayed in a common illustration based on a common time axis, wherein a relative time measure is preferably displayed for the time axis, a time measure which relates to available maximum operating speed of the forming machine to be programmed.

14. The method according to claim 1, wherein a current position value of an axial movement or a position value of an axial movement present at a moment to be selected by the operator is displayed in a display field based on a common time axis.

15. The method according to claim 1, wherein a test run is carried out after completion of programming of a course of movement, drives of the drive system being monitored for overload during the test run, an overload signal being produced if a drive experiences a state of overload during the test run, and the programmed course of movement being controlled on the basis of the overload signal, a preferably drive-selective overload display being controlled in response to an overload signal.

16. The method according to claim 15, wherein the operating speed is reduced and/or a movement law of a drive at risk is changed automatically or by an operator to control the course of movement.

17. A system that programs control of a forming machine, which is a bending machine that bends wire or pipe, the forming machine having a plurality of controllable machine axes, a control device for coordinated control of axial movements of the machine axes, and an operator unit connected to the control device for data exchange and having an associated display unit to operate the forming machine, wherein the system carries out a method comprising:
- displaying an axis selection menu (AAM) with graphical symbols for machine axes of the forming machine;
- receiving an input for selecting a machine axis to be programmed;
- displaying an axial movement menu (ABM) containing options for the input of movement parameters for definition of a course of movement of the axial movement of the selected machine axis;
- receiving inputs for definition of movement parameters;
- displaying an axial movement coordination menu (ABKM) containing options for the input of coordination parameters for use in coordinating courses of movement of the axial movements of machine axes; and
- receiving inputs for definition of values for coordination parameters.

18. A bending machine that bends wire or pipe, having a plurality of controllable machine axes, a control device for the coordinated control of axial movements of the machine axes and an operator unit with an associated display unit that operates the forming machine, wherein the bending machine comprises a system that programs control of a forming machine, which is a bending machine that bends wire or pipe, the forming machine having a plurality of controllable machine axes, a control device for coordinated control of axial movements of the machine axes, and an operator unit connected to the control device for data exchange and having an associated display unit to operate the forming machine, wherein the system carries out a method comprising:
- displaying an axis selection menu (AAM) with graphical symbols for machine axes of the forming machine;
- receiving an input for selecting a machine axis to be programmed;
- displaying an axial movement menu (ABM) containing options for the input of movement parameters for definition of a course of movement of the axial movement of the selected machine axis;
- receiving inputs for definition of movement parameters;
- displaying an axial movement coordination menu (ABKM) containing options for the input of coordination parameters for use in coordinating courses of movement of the axial movements of machine axes; and
- receiving inputs for definition of values for coordination parameters.

19. The bending machine according to claim 18, wherein, by a draw-in device that draws an elongate workpiece into the region of a forming device of the forming machine, the draw-in device being an adjustable draw-in device wherein the position and/or orientation of the draw-in device can be adjusted with aid of one of the controllable machine axes.

20. The forming machine according to claim 19, wherein the machine axis associated with the draw-in device is controllable such that the draw-in device can be adjusted during production of a spring such that a feed direction defined by the draw-in device always extends substantially tangentially to a winding of a spring just being produced.

21. A computer program product comprising executable program code stored on at least one non-transient computer-readable medium or is implemented as a signal, wherein the computer program product, when loaded into the memory of a computer and run by a computer, causes the computer or a forming machine controlled by the computer to carry out a method comprising:
- displaying an axis selection menu (AAM) with graphical symbols for machine axes of the forming machine;
- receiving an input for selecting a machine axis to be programmed;
- displaying an axial movement menu (ABM) containing options for the input of movement parameters for definition of a course of movement of the axial movement of the selected machine axis;
- receiving inputs for definition of movement parameters;
- displaying an axial movement coordination menu (ABKM) containing options for the input of coordination parameters for use in coordinating courses of movement of the axial movements of machine axes; and
- receiving inputs for definition of values for coordination parameters.

* * * * *